(12) United States Patent
Körner et al.

(10) Patent No.: US 11,657,707 B2
(45) Date of Patent: May 23, 2023

(54) SYSTEM FOR CALCULATING AN ERROR PROBABILITY OF VEHICLE SENSOR DATA

(71) Applicant: Continental Automotive GmbH, Hannover (DE)

(72) Inventors: Rene Alexander Körner, Munich (DE); Susanne Eyrisch, Munich (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 239 days.

(21) Appl. No.: 16/955,418

(22) PCT Filed: Dec. 17, 2018

(86) PCT No.: PCT/EP2018/085194
§ 371 (c)(1),
(2) Date: Jun. 18, 2020

(87) PCT Pub. No.: WO2019/121510
PCT Pub. Date: Jun. 27, 2019

(65) Prior Publication Data
US 2021/0012648 A1 Jan. 14, 2021

(30) Foreign Application Priority Data
Dec. 21, 2017 (DE) ................. 10 2017 223 632.9

(51) Int. Cl.
*G08G 1/01* (2006.01)
*B60W 50/02* (2012.01)
(Continued)

(52) U.S. Cl.
CPC ....... *G08G 1/0129* (2013.01); *B60W 50/0205* (2013.01); *G01C 21/3492* (2013.01);
(Continued)

(58) Field of Classification Search
CPC .... G08G 1/0129; G08G 1/0112; G01C 21/32; G01C 21/3492; G01C 21/3602;
(Continued)

(56) References Cited

U.S. PATENT DOCUMENTS

| 7,706,963 | B2 * | 4/2010 | Parikh | ................. | G08G 1/20 |
| | | | | | 340/901 |
| 8,456,562 | B2 | 6/2013 | Ishii et al. | ................. | 348/335 |

(Continued)

FOREIGN PATENT DOCUMENTS

| CA | 2766880 | A1 * | 1/2011 | ............... | G06N 7/00 |
| CN | 101297299 | A | 10/2008 | ............. | G06F 19/00 |

(Continued)

OTHER PUBLICATIONS

Chinese Office Action, Application No. 201880082331.0, 15 pages, dated Jul. 5, 2021.
(Continued)

*Primary Examiner* — Jeff A Burke
*Assistant Examiner* — Kyle T Johnson
(74) *Attorney, Agent, or Firm* — Slayden Grubert Beard PLLC

(57) ABSTRACT

Various embodiments include a system for calculating an error probability of a sensor data record in vehicles, the system comprising: a sensor unit with sensors in a vehicle, the sensor unit configured to provide a sensor data record for an object in an environment of the vehicle; a central computer receiving the sensor data record from the sensor unit; and a reference database storing reference data associated with a position of the vehicle noted at when the sensor data record was generated. The central computer is programmed to refer to reference data in the calculation of an error probability of the sensor data record.

8 Claims, 3 Drawing Sheets

(51) Int. Cl.
*G01C 21/34* (2006.01)
*G01C 21/36* (2006.01)
*G06N 7/01* (2023.01)

(52) U.S. Cl.
CPC ........... *G01C 21/3602* (2013.01); *G06N 7/01* (2023.01); *G08G 1/0112* (2013.01); *B60W 2050/0215* (2013.01)

(58) Field of Classification Search
CPC ................. G06N 7/005; G09B 29/007; B60W 2050/0215; B60W 50/0205
See application file for complete search history.

(56) References Cited

U.S. PATENT DOCUMENTS

| | | | | |
|---|---|---|---|---|
| 9,747,801 | B2* | 8/2017 | Kanter | G06N 7/005 |
| 10,650,682 | B2* | 5/2020 | Grewe | G08G 1/164 |
| 10,942,031 | B2* | 3/2021 | Koda | G08G 1/0129 |
| 11,077,845 | B2* | 8/2021 | Shalev-Shwartz | B60W 60/0027 |
| 2010/0253775 | A1* | 10/2010 | Yamaguchi | G01C 21/3647 348/135 |
| 2011/0125401 | A1 | 5/2011 | Stählin | |
| 2013/0080050 | A1* | 3/2013 | McKitterick | G01S 7/4004 701/534 |
| 2015/0116101 | A1* | 4/2015 | Kanter | G08G 1/16 340/435 |
| 2017/0067763 | A1* | 3/2017 | Kodeswaran | G06N 7/005 |
| 2017/0157769 | A1* | 6/2017 | Aghamohammadi | G01C 21/32 |
| 2017/0210359 | A1* | 7/2017 | Brandin | B60W 50/14 |
| 2017/0277716 | A1* | 9/2017 | Giurgiu | G06F 16/23 |
| 2018/0370533 | A1* | 12/2018 | Sofra | B60W 30/10 |
| 2021/0012648 | A1* | 1/2021 | Körner et al. | B60W 50/0205 |

FOREIGN PATENT DOCUMENTS

| | | | |
|---|---|---|---|
| CN | 106796760 A | 5/2017 | ............... G08G 1/01 |
| DE | 10 2008 012 661 | 2/2009 | ........... G08G 1/0968 |
| DE | 102013213106 A1 | 3/2015 | ............. B60R 16/02 |
| DE | 102016011016 A1 | 4/2017 | ................ B60J 3/02 |
| DE | 10 2015 014 651 | 5/2017 | ........... G08G 1/0965 |
| EP | 3 222 973 | 9/2017 | ............. G01C 21/32 |
| JP | 2011027594 A | 2/2011 | ............. G01C 21/00 |
| WO | 2011/027594 A1 | 3/2011 | ............... A61B 1/00 |
| WO | 2017/212639 A1 | 12/2017 | ............. G01C 21/28 |

OTHER PUBLICATIONS

Search Report for International Application No. PCT/EP2018/085194, 12 pages, dated Mar. 22, 2019.

Office Action for German Application No. 10 2017 223 632.9, 7 pages, dated Sep. 18, 2018.

Shaohan Hu et al., "SmartRoad: Smartphone-Based Crowd Sensing for Traffic Regulator Detection and Indentification" *ACM Transactions on Sensor Networks*, vol. 11, No. 4. 27 pages, Jul. 1, 2015.

Luliang Tang et al., "Road Network Change Detection Based on Floating Car Data" *Journal of Networks*, vol. 7, No. 7. 9 pages, Jul. 1, 2012.

\* cited by examiner

SYSTEM FOR CALCULATING AN ERROR PROBABILITY OF VEHICLE SENSOR DATA

CROSS-REFERENCE TO RELATED APPLICATIONS

This application is a U.S. National Stage Application of International Application No. PCT/EP2018/085194 filed Dec. 17, 2018, which designates the United States of America, and claims priority to DE Application No. 10 2017 223 632.9 filed Dec. 21, 2017, the contents of which are hereby incorporated by reference in their entirety.

TECHNICAL FIELD

The present disclosure relates to motor vehicles. Various embodiments many include analysis of sensor data from vehicles and systems and/or methods for calculating an error probability of sensor data from a vehicle.

BACKGROUND

Intelligent sensors which capture, process, and forward a large number of physical variables and operating variables are increasingly employed in modern vehicle systems. The development of sensors and increasing computer capacities make it possible to collect and process ever more detailed information about the vehicle itself, but also about an environment of a vehicle. On the application side, digital map applications and navigation systems play an important role. These support systems are intended to provide a driver with traffic-related information as comprehensively and early as possible, for example for predictive vehicle control. For example, in anticipation of an approaching obstacle or a dangerous situation, a speed can be automatically reduced, warnings can be generated or, for example, a suspension can be adjusted.

In practice, this requires the most current information possible, which can be stored, for example, in digital map applications or navigation applications. Nowadays, map data are mainly captured using specially equipped vehicles in certain time cycles of months, sometimes over the course of years. As a result, the map data are often out of date, particularly due to the smaller number of such measurement trips in rural areas. Some solutions use the sensors which are already present in the vehicle to capture the environment of a vehicle by means of sensors and use the sensor data obtained to update the map data. The requirements for recentness and accuracy of the sensor data provided are high in this case in order to be able to obtain relevant information from the digital map material.

An update device for updating a digital map for a vehicle is described in DE 10 2008 012661 A1, which update device has a large number of sensors which measure the current traffic situation, the movement of the vehicle or else the road conditions. These measured values are transferred to a control center which evaluates them and then sends corresponding update data to other vehicles to update the digital map.

SUMMARY

Various embodiments of the teachings herein can be used to increase data quality and reliability of vehicle-based sensor data and can thus reduce or avoid incorrect information for subsequent applications. For example, some embodiments include a system (10) for calculating an error probability (38) of a sensor data record (12) in vehicles (14), comprising: a sensor unit (32) with sensors (24) in a vehicle (14); wherein the sensor unit (32) is configured to provide a sensor data record (12) for an object (20) in the environment of the vehicle (14); a central computer (26) which is designed to receive the sensor data record (12) from the sensor unit (32); a reference database (34) with reference data (36); the reference data (36) having a reference to a position of the vehicle (14) at the time the sensor data record (12) was generated; wherein the central computer (26) is designed to use reference data (36) from the reference database (34) to calculate an error probability (38) of the sensor data record (12).

In some embodiments, the central computer (26) is designed to classify the sensor data record (12) into an object class and the reference data (36) are selected specifically for the object class.

In some embodiments, the reference data (36) in the reference database (34) are assigned an error probability; wherein the central computer (26) takes the error probability of the reference data (36) into account when calculating the error probability (38) of the sensor data record (12) in such a way that the associated reference data (36) are given a lower weighting as the error probability increases.

In some embodiments, the central computer (26) is designed to calculate the error probability of the reference data (36) on the basis of further reference data (36) and/or on the basis of the sensor data records (12).

In some embodiments, the sensor unit (32) in the vehicle (14) calculates a preliminary error probability (38) of the sensor data record (12).

In some embodiments, the reference data (36) are weather data, traffic flow data, traffic control data, sensor data records (12) from the same vehicle, sensor data records (12) from other vehicles and/or digital map data (28).

In some embodiments, the objects (20) are traffic signs, lane markings, weather conditions, lanes, traffic light conditions, road conditions, vehicles, obstacles and/or barriers.

As another example, some embodiments include a method (100) for calculating an error probability (38) of a sensor data record (12) of a sensor (24), comprising the steps of: receiving (110) a sensor data record (12) by means of a central computer (26); classifying (120) the sensor data record (12) by means of the central computer (26); selecting and reading (130) object-class-specific reference data (36) from a reference database (34) by means of the central computer (26); and calculating (140) an error probability (38) of the sensor data record (12) based on the reference data (36) by means of the central computer (26).

Some embodiments include providing (150) the sensor data record (12) and the associated error probability (38) by means of the central computer (26) for a digital map application (30).

In some embodiments, the central computer (26) compares (160) the error probability (38) of the sensor data record (12) with a defined threshold value and identifies the sensor data record (12) as incorrect if the threshold value is exceeded.

BRIEF DESCRIPTION OF THE DRAWINGS

Exemplary embodiments of the teachings of the present disclosure are described below on the basis of graphic representations. The figures are only schematic and not to scale. Identical or similar elements are provided with the same reference signs.

DETAILED DESCRIPTION

Figure 1:
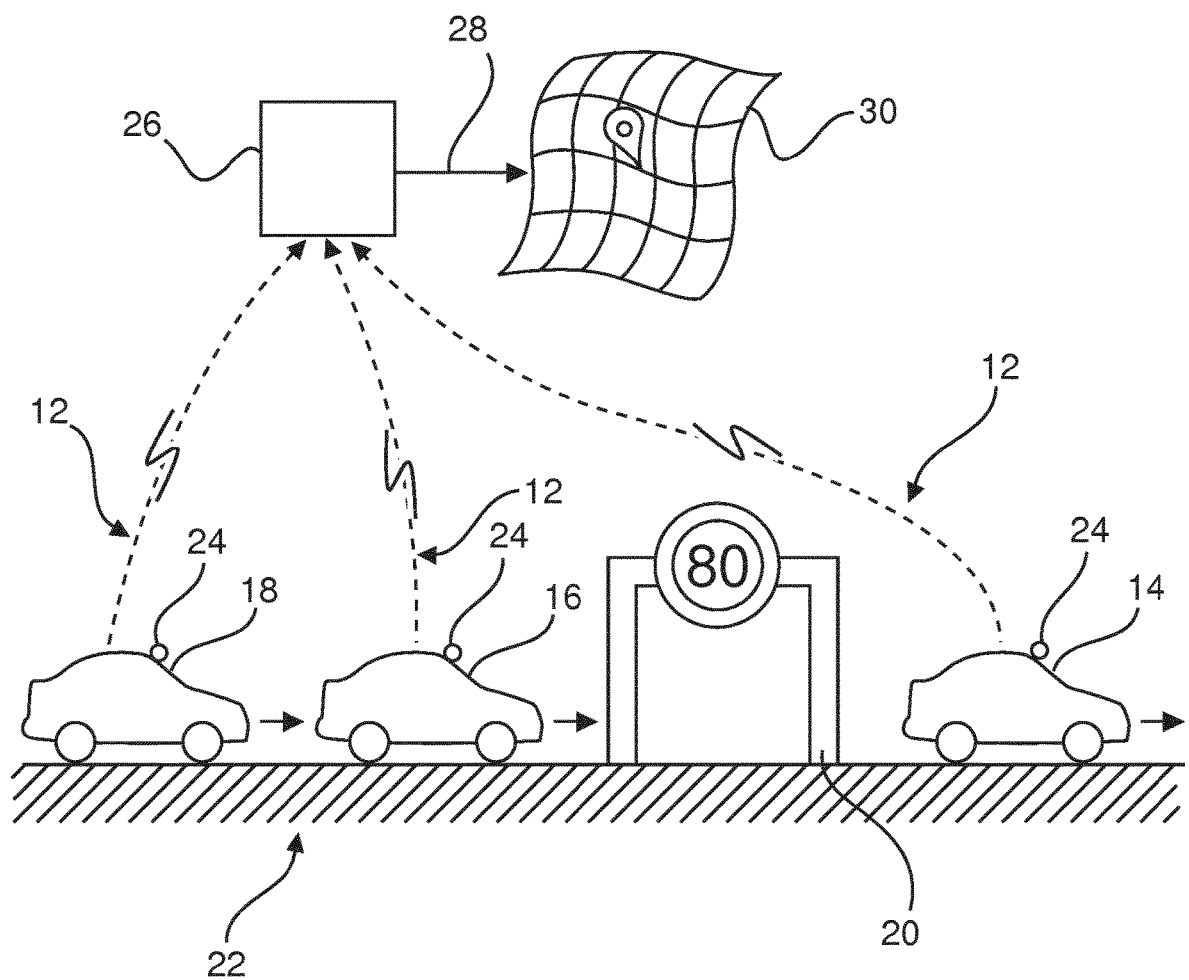
FIG. 1 shows a system according to the prior art for the central processing of vehicle-based sensor data in digital maps.

In order to significantly improve the recentness of the digital map data, it would be desirable, ideally in real time or with only slight delays, to store possible changes in the environment of a vehicle as quickly as possible as digital map data so that this information can be immediately made available to all those involved. There are now a large number of manufacturers, sensors, and systems that also measure a large number of physical variables and capture a wide variety of types of data. In particular, it can often happen that incorrect data are consequently captured, for example, by faulty sensors and are transmitted to a control center. It would therefore be desirable to identify these incorrect data and, if necessary, to eliminate them so that they do not falsify a result.

Some embodiments of the teachings herein include a system for calculating an error probability of sensor data in vehicles. The system has a sensor unit with sensors in a vehicle. The vehicle is, for example, a motor vehicle, such as an automobile, a bus or a truck, or else a rail vehicle, a ship, an aircraft, such as a helicopter or an airplane, or for example a bicycle.

The sensor unit produces a sensor data record for an object in the environment of the vehicle. In this context, the term object describes, on the one hand, static objects, for example traffic signs, obstacles, street signs, other vehicles, people and animals etc., and also dynamic objects such as traffic light conditions, weather phenomena, road conditions such as black ice, fog, changes in the course of a lane marking and the like. In other words, all conditions that can be captured by sensors, that is to say impressions, events, and observations, can also be understood as an object. Depending on the type of sensor, the environment of the vehicle can therefore mean the vehicle itself, but also several meters or several hundred meters around the vehicle.

The system also has a central computer receiving the sensor data record from the sensor unit. In some embodiments, this central computer can be a cloud-based server which is arranged at a central location or at a plurality of central locations. In some embodiments, the sensor data records from different vehicles can be evaluated in their entirety at a logically central location. Wireless transmission of the sensor data records from the sensor unit to the central computer can be carried out using a wide range of radio standards such as Bluetooth®, WLAN (e.g. WLAN 802.11a/b/g/n or WLAN 802.11p), ZigBee, WiMAX or even cellular radio systems such as GPRS, UMTS or LTE. It is also possible to use other transmission protocols. The cited protocols provide the advantage of the standardization that has already taken place.

The system also has a reference database with reference data, the reference data having a reference to a position of the vehicle at the time the sensor data record was generated. Reference data can be a wide variety of types of information and data that are related to the sensor data. For example, these can be reference data from a database of a traffic control center if the sensor data represent the optical capture of a dynamic traffic sign. The reference to the position of the vehicle and the time has the advantage or purpose that both the sensor data and the reference data relate to the same object or event or observation, and thus have a reference to one another.

In some embodiments, the central computer uses the reference data from the reference database to calculate an error probability for the sensor data record. In other words, the reference information from the reference data records is used to check whether a sensor data record appears plausible in the light of the information obtained from other, independent sources. A large number of reference data items from different sources can therefore make a statement as to whether or not a sensor data record is defective with a certain probability. It can be an advantage of a now known error probability that outliers and unlikely extreme values can be better recognized and possibly discarded.

In some embodiments, the reference data are generated from sensor data from other vehicles. This is intended to describe the case where the correctness of a sensor data record from a vehicle is checked by a certain number of other vehicles transmitting the same or similar data records. In rural areas in particular, however, the number of vehicles that pass an object can be very small within any given period of time, so that possibly incorrect information can only be corrected much later. In some embodiments, a large number of other, external data sources and databases can be used as a reference and can be used to calculate an error probability even in the absence of other vehicles.

In some embodiments, the central computer is designed to classify the sensor data into object classes and to select the reference data specifically for the object class. In other words, the central computer is designed such that it first analyzes and recognizes the type and origin of the sensor data and uses the identified object class to select and use the suitable reference data for calculating the error probability. An object class can include, for example, country-specific signs, road conditions, weather phenomena, traffic flow data, data from comparable road objects or previous observations of objects. What is meant here is a rough division into the type of observation, which is then assigned suitable reference data which are determined for a meaningful calculation of an error probability. This assignment of reference data to object classes can, for example, be defined in advance and stored in the central computer.

In some embodiments, the reference data in the reference database are assigned a respective error probability. In other words, not only does the sensor data record have an error probability, but the reference data themselves can also have different degrees of reliability or credibility. When calculating the error probability of the sensor data record, the central computer takes into account the error probability of the reference data such that the associated reference data are given a lower weighting as the error probability increases. If, for example, ice is reported on a section of road by means of a sensor data record, information from a social network can be consulted. If information about the road condition is published there with regard to the same geographical position and time, it is usually not checked and is therefore rather susceptible to incorrect information. An error probability of the reference data record can concomitantly include this fact in a calculation of the error probability of the sensor data record.

In some embodiments, the central computer is designed to calculate the error probability of the reference data on the basis of further reference data and/or on the basis of the sensor data. In other words, the central computer is able to calculate a reliability or credibility of reference data based on previous calculations in the context of the other reference data and the sensor data. If the history thus shows that a reference data record mainly contains contrary information in comparison with the other reference data, it is likely that this reference data record is less credible and an error probability of this reference data source therefore increases.

In some embodiments, the sensor unit in the vehicle calculates a preliminary error probability of the sensor data. This can be done, for example, on the basis of further sensor data from the vehicle, but also on the basis of reference data from reference databases. For this purpose, the vehicle itself can incorporate external reference data or information from its own on-board system via its own communication devices and can calculate a preliminary error probability which is then optionally calculated in a second step with further data in the central computer to give a resulting error probability. The advantage here can be that, for example, for the direct use of the sensor data in the vehicle, an evaluation already takes place on the basis of reference data, and thus an error rate of the sensor data records can decrease. For example, cameras can have a lower detection rate in situations with limited visibility, for example in fog. The sensor unit knows from on-board information, for example due to the fog light being switched on, that there are obviously fog conditions and can thus calculate a preliminary error probability autonomously without using external data sources.

In some embodiments, the reference data are, for example, weather data, traffic flow data, traffic control data, sensor data from the same vehicle, sensor data from other vehicles and/or digital map data. The term "digital maps" or "digital map data" is also intended to be understood to mean maps for advanced driver assistance systems (ADASs), without navigation taking place. In a further embodiment of the invention, the objects are, for example, traffic signs, lane markings, weather conditions, lanes, traffic light conditions, road conditions, vehicles, obstacles and/or barriers.

In some embodiments, there a method for calculating an error probability of sensor data records of a sensor with the steps described below. A central computer receives sensor data. The sensor data are then classified by the central computer. This means that, as described above, object classes are recognized that allow a rough division into similar objects. In a further step, the central computer selects and reads object-class-specific reference data from a reference database. On the basis of the object class recognized in the previous step, suitable reference data for validating and assessing the correctness or plausibility of the sensor data are therefore selected and read out from the reference database.

In some embodiments, an error probability of the sensor data is calculated on the basis of the selected reference data by the central computer. This calculated error probability can be made available to a digital map application by the central computer, according to one embodiment of the invention, together with the sensor data including position data. This means that the data obtained can be displayed graphically on a map surface using position data, for example, optionally with the display of the calculated error probability.

In some embodiments, the central computer compares the calculated error probability of the sensor data with a defined threshold value and identifies the sensor data as incorrect if this threshold value is exceeded. In other words, sensor data recognized as incorrect are discarded and can thus advantageously avoid falsification or misinterpretation of the sensor data, for example in the context of an application based thereon.

FIG. 1 shows an example of a system from the prior art in which vehicle-based sensor data records 12 are centrally combined, processed and processed as digital map data. On a road section 22 there is an object 20 which here is specifically a variable traffic sign for speed limitation, which can often be found on sign bridges on freeways. Depending on the traffic situation, the displayed maximum speed can be dynamically adjusted here by a traffic control center. If, for example, the displayed maximum speed changes, a first vehicle 14 visually captures the object 20 with a sensor 24 as it passes the object. In this case, the sensor 24 is, for example, a camera that is oriented in the direction of travel of the vehicle 14.

The first vehicle 14 now reports a sensor data record 12 to a central computer 26. This can be done, for example, using wireless transmission methods such as 4G/5G, UMTS, Wi-Fi or WLAN. If a second vehicle 16 and a third vehicle 18 now also pass the object 20, their sensor data 12 are likewise transmitted to the central computer 26. If the central computer 26 receives matching sensor data records 12, it can be assumed that the reported sensor data records 12 are correct, whereupon the central computer generates digital map data 28 for a map application 30 and, if necessary, updates existing digital map data 28 for the same object 20. It can be problematic here if mismatched sensor data 12 are received by the central computer 26 and it remains unclear to what extent the transmitted sensor data records 12 may be incorrect.

Figure 2:
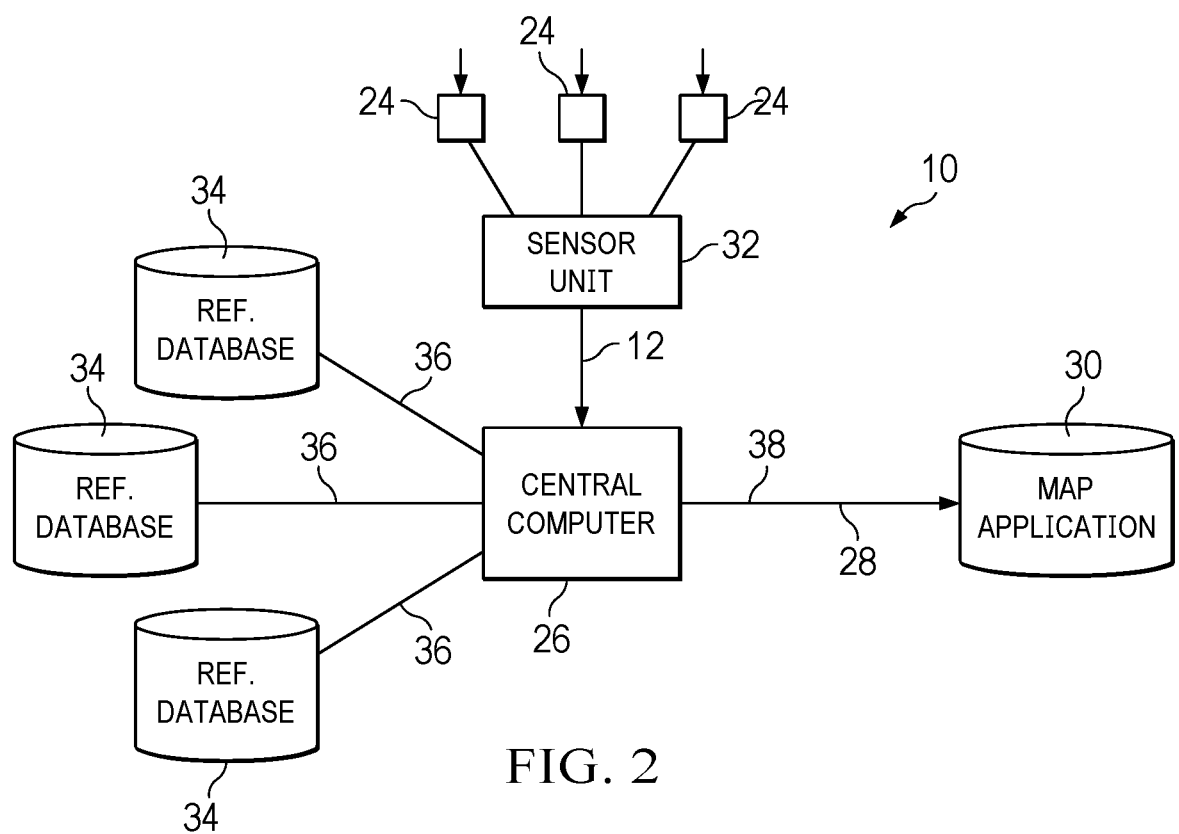
FIG. 2 shows a schematic representation of a system incorporating teachings of the present disclosure for calculating an error probability of sensor data.

A system 10 according to the invention which solves this problem is described in FIG. 2. Various sensors 24 are connected to a sensor unit 32 in the vehicle. This sensor unit 32 can perform various functions within a vehicle. This can be, for example, preprocessing or conditioning of signals from the sensors 24 or control of the sensors 24. In one example, the sensor unit 32 calculates a preliminary error probability 38 (see further below). The sensor unit 32 is configured such that it generates a sensor data record 12 from the totality of the sensor signals from the connected sensors 24, which sensor data record describes an object 20 (see FIG. 1) in the environment of the vehicle 14.

A central computer 26 receives this sensor data record 12. The central computer 26 preferably classifies the received sensor data record 12 with regard to predefined object classes. A plurality of reference databases 34 are connected to the central computer 26. The central computer 26 selects suitable reference databases 34 on the basis of the identified object classes and reads out reference data 36. In this case, these reference data 36 have a reference to a position of the vehicle 14 at the time the sensor data record 12 was generated. The central computer 26 uses these reference data 36 to calculate an error probability 38 of the sensor data record 12. This error probability 38 of the sensor data record 12 is converted, together with the sensor data record 12 and position data, into digital map data 28 and is made available to a map application 30, shown here as a database.

Figure 3:
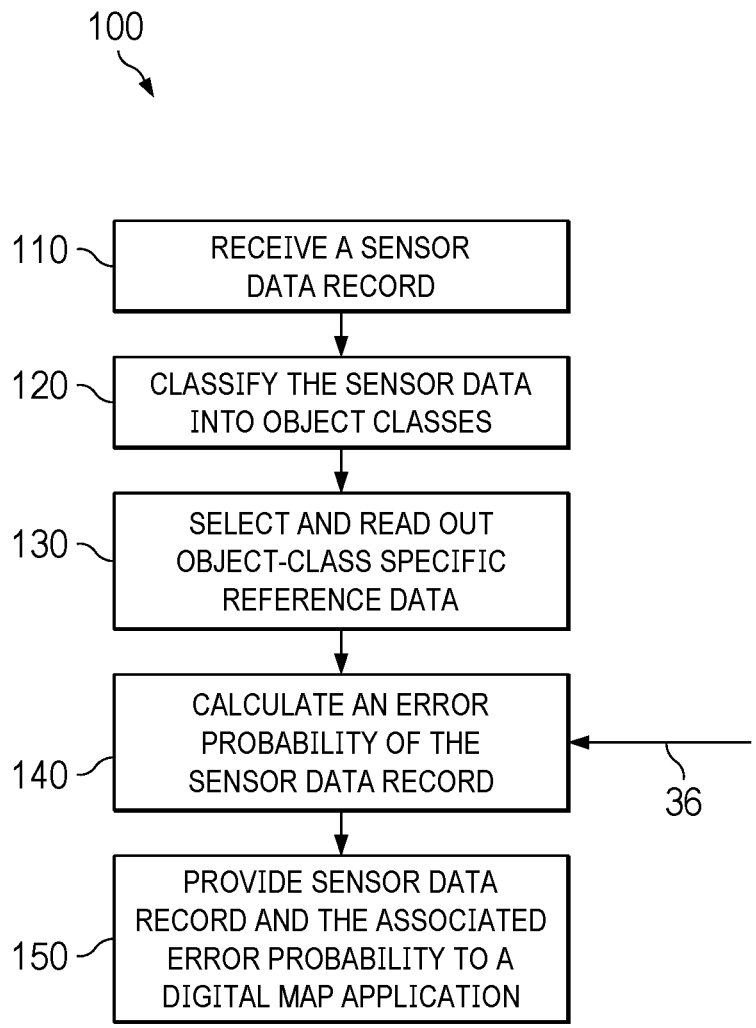
FIG. 3 shows a method incorporating teachings of the present disclosure for calculating an error probability of sensor data from a vehicle.

FIG. 3 shows a method incorporating teachings of the present disclosure for calculating an error probability 38 of sensor data 12 is shown in FIG. 3. A central computer 26 receives 110 a sensor data record 12 in this case. In a next step, the central computer 26 classifies 120 the sensor data record 12 into object classes.

In step 130, the central computer 26 selects and reads out object-class-specific reference data 36 from a reference database 34. In step 140, an error probability 38 of the sensor data record 12 is calculated by the central computer 26 on the basis of the reference data 36. Finally, in step 150, the sensor data record 12, together with the associated error probability 38, is made available to a digital map application 30 by the central computer 26.

What is claimed is:

1. A system for calculating an error probability of a sensor data record in vehicles, the system comprising:
   a sensor unit with sensors in a vehicle, the sensor unit configured to provide a sensor data record for an object in an environment of the vehicle;
   a central computer receiving the sensor data record from the sensor unit; and
   a reference database storing reference data associated with a position of the vehicle noted when the sensor data record was generated;
   wherein the central computer is programmed to calculate an error probability of the sensor data record using existing reference data;
   wherein the reference data in the reference database have a preassigned error probability;
   wherein calculating the error probability of the sensor data record depends at least in part on the preassigned error probability of the reference data;
   wherein the associated reference data are given a lower weighting as the error probability increases;
   wherein the central computer is further programmed to compare the error probability of the sensor data record with a defined threshold value and adjust the error probability of the associated reference data based on the sensor data record only if the error probability is below the defined threshold value.

2. The system as claimed in claim 1, wherein the central computer is further programmed to classify the sensor data record into an object class and relevant reference data are selected based on the object class.

3. The system as claimed in claim 1, wherein the central computer is further programmed to calculate the error probability of the reference data on the basis of further reference data and the sensor data records.

4. The system as claimed in claim 1, wherein the sensor unit calculates a preliminary error probability of the sensor data record.

5. The system as claimed in claim 1, wherein the reference data include at least one datum selected from the group consisting of: weather data, traffic flow data, traffic control data, sensor data records from the same vehicle, sensor data records from other vehicles, and digital map data.

6. The system as claimed in claim 1, wherein the objects include at least one item selected from the group consisting of: traffic signs, lane markings, weather conditions, lanes, traffic light conditions, road conditions, vehicles, obstacles, and barriers.

7. A method for updating navigation and management systems of a vehicle, the method comprising:
   receiving a sensor data record at a central computer;
   classifying the sensor data record at the central computer;
   selecting and reading object-class-specific reference data from a reference database in communication with the central computer, wherein the reference data have a preassigned error probability;
   calculating an error probability of the sensor data record based on the preassigned error probability of the reference data; and
   providing the calculated error probability to vehicle systems from the central computer;
   comparing the error probability of the sensor data record with a defined threshold value; and
   adjusting the preassigned error probability of the associated reference data in the reference database based on the sensor data record only if the error probability is below the defined threshold value;
   wherein the associated reference data are given a lower weighting as the error probability increases.

8. The method as claimed in to claim 7, further comprising providing the sensor data record and the associated error probability from the central computer to a digital map application.

* * * * *